United States Patent
Bussmann et al.

(10) Patent No.: US 12,544,971 B2
(45) Date of Patent: Feb. 10, 2026

(54) APPARATUS FOR THE PRODUCTION OF INLINE STRETCHED TUBULAR FOILS BY BLOWING PROCESS

(71) Applicant: Windmöller & Hölscher KG, Lengerich (DE)

(72) Inventors: Markus Bussmann, Lengerich (DE); Karsten Golubski, Lengerich (DE); Henning Voss, Lengerich (DE); Manuel Sollert, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 323 days.

(21) Appl. No.: 17/769,492

(22) PCT Filed: Oct. 14, 2020

(86) PCT No.: PCT/EP2020/078829
§ 371 (c)(1),
(2) Date: Apr. 15, 2022

(87) PCT Pub. No.: WO2021/074181
PCT Pub. Date: Apr. 22, 2021

(65) Prior Publication Data
US 2024/0149520 A1    May 9, 2024

(30) Foreign Application Priority Data

Oct. 16, 2019   (DE) .................... 10 2019 127 993.3

(51) Int. Cl.
*B29C 55/28*    (2006.01)
*B29C 48/00*    (2019.01)

(52) U.S. Cl.
CPC .......... *B29C 55/28* (2013.01); *B29C 48/0018* (2019.02); *B29C 2948/92647* (2019.02); *B29C 2948/92704* (2019.02)

(58) Field of Classification Search
CPC ...................... B29C 2948/92704; B29C 55/28
See application file for complete search history.

(56) References Cited

U.S. PATENT DOCUMENTS

| 4,978,484 A * | 12/1990 | Takashige ............. B29C 48/865 |
| | | 264/408 |
| 6,246,028 B1 * | 6/2001 | Lage ...................... B29C 48/91 |
| | | 219/404 |

(Continued)

FOREIGN PATENT DOCUMENTS

| EP | 0335411 A2 | 10/1989 |
| EP | 1719602 A1 | 11/2006 |

(Continued)

*Primary Examiner* — Alison L Hindenlang
*Assistant Examiner* — Alexander A Wang
(74) *Attorney, Agent, or Firm* — Mandar A. Joshi; Bret E. Field; Bozicevic, Field & Francis LLP

(57) ABSTRACT

The present invention relates to an apparatus for producing inline stretched tubular foils by the blowing process, having a blown foil system comprising an extruder, a blowing head, a cooling ring, a calibrating basket, a flat laying unit and a reversing turret haul-off, having a stretching system for monoaxially stretching the laid flat foil in the machine direction and with a first thinness control system which operates segmented control zones in the cooling ring to form thinness sections so that, during stretching, a foil is produced with a thickness profile having the smallest possible deviations from the medium foil thickness over the complete foil width. To increase the accuracy and speed of the first thinness section control system, a second thinness section control system is provided which controls two opposing heat sources between the calibrating basket and the flat laying unit and which can be connected to the first thinness section control system.

12 Claims, 4 Drawing Sheets

(56) References Cited

U.S. PATENT DOCUMENTS

Figure 1:
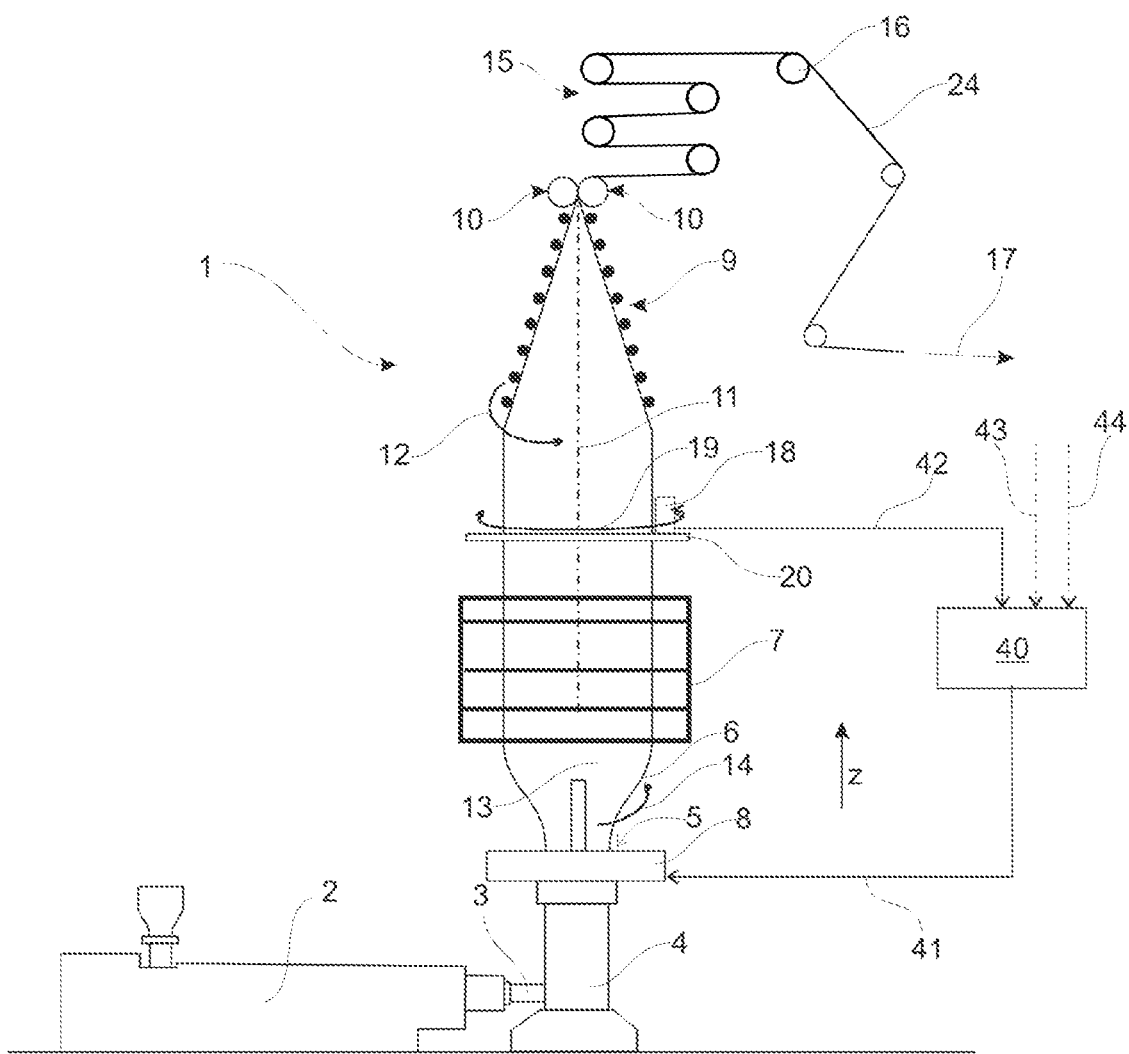

| | | | |
|---|---|---|---|
| 2004/0113331 A1 | 6/2004 | Miyata et al. | |
| 2008/0023866 A1* | 1/2008 | Oedl | B65H 20/02 |
| | | | 425/143 |
| 2011/0006452 A1* | 1/2011 | Bayer | B29C 55/28 |
| | | | 425/141 |
| 2014/0057010 A1* | 2/2014 | Rubbelke | B29C 48/913 |
| | | | 425/72.1 |
| 2023/0018826 A1* | 1/2023 | Nappa | B29C 55/28 |

FOREIGN PATENT DOCUMENTS

| | | |
|---|---|---|
| JP | S62-73922 U | 5/1987 |
| WO | WO2012080276 A2 | 6/2012 |
| WO | WO2018215945 A1 | 11/2018 |

* cited by examiner

APPARATUS FOR THE PRODUCTION OF INLINE STRETCHED TUBULAR FOILS BY BLOWING PROCESS

The present invention relates to an apparatus for the production of inline stretched tubular foils by the blowing process.

The production of tubular foils by the blowing foil process is usually carried out by blown foil extrusion systems, which have been in use for a long time. Such systems are fed with plastics in granulated form, which are then plasticized in extruders under high pressure to form a viscous mass. This mass, having a high temperature resulting from the pressure, is formed into a ring shape in a blowing head and discharges from the blowing head through an annular nozzle. Directly after leaving the annular nozzle, the mass already forms a foil tube. Since this foil tube has not yet cooled down completely, however, its diameter can be changed. Normally, the diameter is increased by blowing compressed air into the interior of the foil tube. For the foil tube to have a constant diameter, it is led at a distance from or directly along foil guide elements. This arrangement of foil guiding elements is referred to as a calibrating basket in the field of blown foil extrusion systems.

Once it has passed through the calibrating basket, the foil tube can be flattened in a reversing turret haul-off, laid out and then stretched monoaxially in the machine direction in a stretching unit.

By stretching thermoplastic foils, their properties can be changed in a targeted way. These properties include, for example, transparency or strength. This kind of stretching, which can be carried out in the transverse and/or longitudinal direction of the foil web, can be carried out inline right after the extrusion process. The stretching or drawing-out of thermoplastic foils is described, for example, in WO 2006/063641 A1 and WO 2011/057918 A1.

In the production of tubular foils, foil thickness profile control systems with segmented control zones are used. These systems enable the foil thickness profiles to be controlled in such a way that the thickness deviations are as small as possible over the complete circumference of the tubular foil.

DE 39 411 85 A1, for example, provides a method for controlling the foil thickness of tubular foils from blown foil systems with downstream axial or biaxial stretching of the blown tubular foils in an oven, so that a final foil is produced which has the lowest possible thickness deviations.

During the longitudinal stretching in a stretching unit, the foil is stretched in the machine direction according to the degree of stretching, thereby reducing the foil thickness. Simultaneously, the foil constricts in the transverse direction, reducing the width of the foil. The result of this constriction is that the stretched foil increases slightly in thickness from the middle of the foil towards the foil edges, although it was previously regulated in the blowing process to as constant a thickness as possible. This increase in thickness is most pronounced at the film edge areas. This results in an edge buildup in foil thickness when the foil is subsequently wound up. The foil web is progressively stretched at the edges as the winding diameter increases.

In order to produce foils with as uniform a thickness profile as possible, such as is required in particular for printing or laminating, the foil edges that do not correspond to the desired thickness profile must be trimmed away. This trimming, however, results in the loss of a large part of the foil width. Thus, up to approx. 200 mm is lost on each side of the foil due to trimming, i.e. cutting away.

From EP 2 277 681 B1, a generic process has become known in which the foil thickness profile of the tubular foil produced in the blown foil system is controlled in such a way that the stretching produces a foil with a thickness profile with the smallest possible deviations from the medium foil thickness over the complete foil width. For this, a tubular foil is produced in the blown film process that has two opposing thinness sections. When flattening the tubular foil, attention is now given to ensuring that the thinness sections are located in the foil edge area and that the stretched foil then has a thickness profile with the smallest possible deviations from the central foil thickness. The thinness sections are thus specifically introduced to compensate for the thickening in the edge area that occurs later during stretching, so that a uniform film thickness extending into the edge area is obtained.

For the selective introduction of the thinness sections, segmented control zones are provided in the cooling ring pursuant to EP 2 277 681 B1, which may consist of heating cartridges, for example. One disadvantage of such a profile control, however, is that the segmented control zones in the cooling ring often have to be operated at their performance limit, thereby limiting the accuracy as well as the speed of the control process.

The task of the invention is therefore to increase the accuracy and speed of the known thinness section control system.

This task is solved by the features of claim 1. Other preferred embodiments can be found in the subclaims.

By connecting a second thin section control system, as proposed by the invention, the following benefits are achieved:

Thinness sections can be placed accurately in the desired places (e.g. folded edge) even when reversing.

Thin sections not accurately positioned by the first thinness section control system are eliminated, which leads to an improved flatness of the foil during rewinding.

A larger control stroke and a higher control speed are available for placing thinness sections.

Through the combination with the first thinness section control system, the required heating power of the heating cartridges in the cooling ring can be reduced.

The thickness profile of the stretched foil has a smaller deviation compared to the target profile. This can reduce the trimming of the edge.

More details and benefits of the invention are described with reference to the accompanying drawings.

Figure 2:
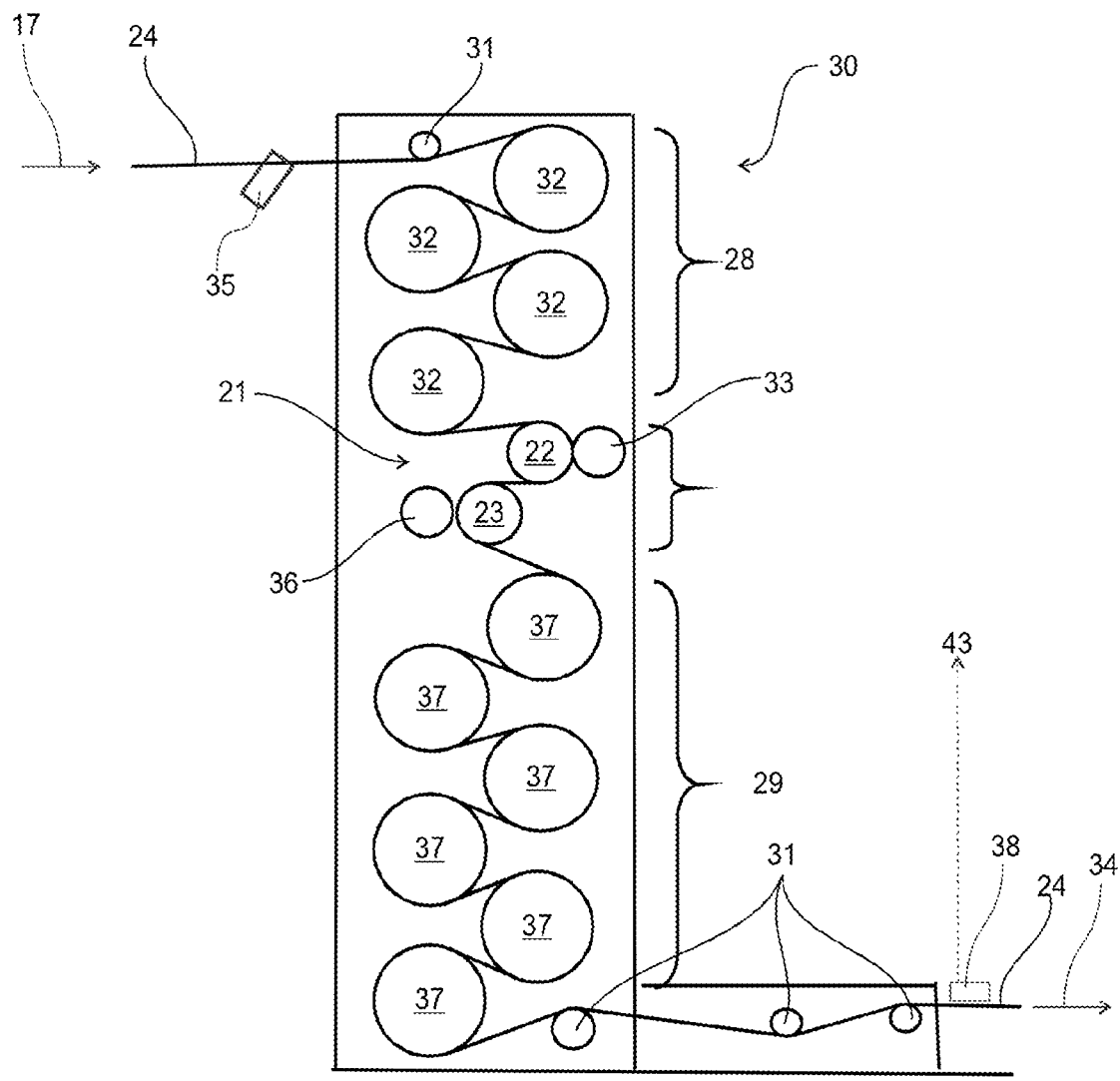
Figure 3:
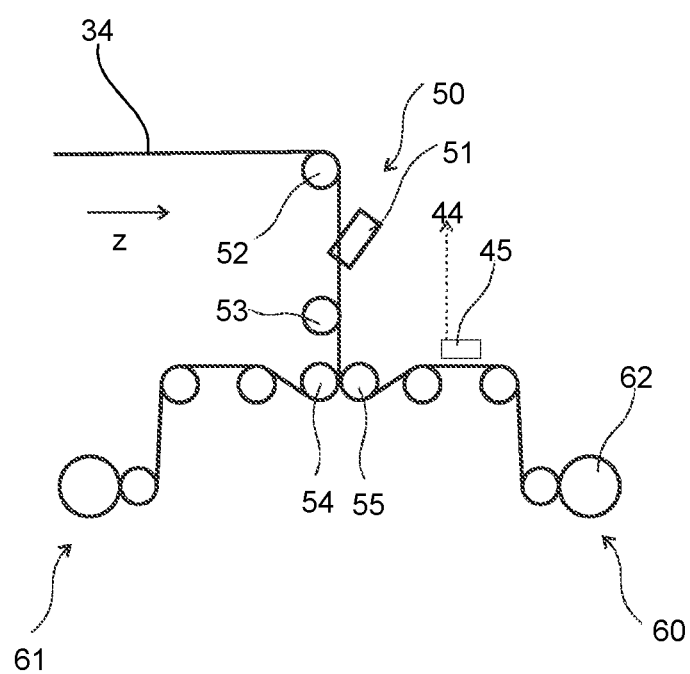
Figure 4:
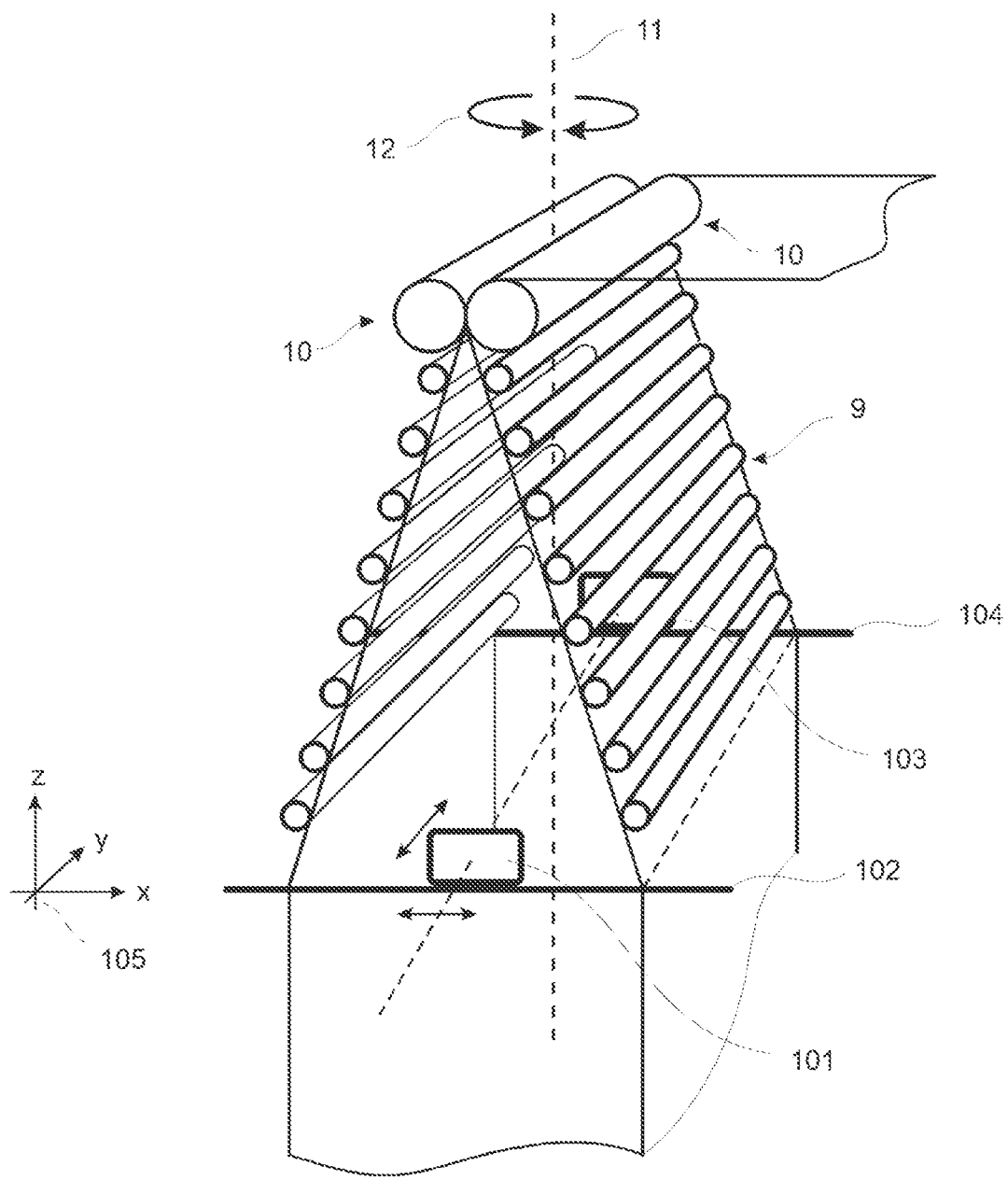

FIG. 1 shows a side view of the blown foil system according to the invention, FIG. 2 shows a side view of the downstream stretching unit, FIG. 3 shows a side view of the downstream winder, and FIG. 4 shows a perspective view of the flat laying unit of FIG. 1.

FIG. 1 shows a blown foil system 1 for producing a foil tube. Plastic granules are melted by extruder 2 and fed to blowing head 4 via line 3. In the blowing head 4, the plastic melt is turned into a cylindrical melt stream, which can then be pulled out of a circular gap 5 of the cooling ring 8 in the pull-off direction z as a foil tube 6. The foil tube 6, not yet solidified, is blown up from the inside with a slight overpressure to the diameter of the calibrating basket 7.

The cooling ring 8 houses segmented control zones belonging to a first thinness section control system which controls the segmented control zones in such a way that, during subsequent stretching, the produced foil has a thickness profile with the smallest possible deviations from the medium foil thickness over the complete foil width.

After the calibrating basket 7, the foil tube 6 is fed to the flat laying unit 9, in which the circular foil tube initially forms an elliptical cross section with increasing eccentricity until finally a double-layer foil web is formed from it by the two discharge rollers 10.

The flat laying device 9 is rotatably arranged, the axis of rotation being substantially aligned with the tube axis 11, which is indicated by a dash-dotted line in FIG. 1. The rotatability of the flat laying device is indicated by the arrow 12.

The blowing head 8 is divided into various circumferential sections. Each circumferential section of the blowing head 8 has the capability of applying to the foil tube an air flow that varies over the circumference of the foil tube and/or a temperature that varies over the circumference of the foil tube. The circumferential sections of the foil tube which are cooled to a lesser extent form a thinness sections 13. Where the cooling effect is greater, by contrast, a thickness area is formed.

To ensure that the thinness section always reaches a fixed position on the flat laying device, it is also necessary for the thinness section to move along the circumference, which is indicated in the figure by the arrow 14. This movement of the thinness section is realized by changing the parameters of the circumferential section of the blowing head 8 that comes next in the direction of the arrow 14, so that a thinness section is now created adjacently to the circumferential section of the foil tube that already has a thinness point. The present thinness section is reversed by the relevant circumferential section of the blowing head 8 now again having a stronger cooling effect on the angular section allocated to it.

To be able to record a thickness profile of the foil tube 6, a first measuring unit 18 is provided which, when viewed in the transport direction z, is preferably arranged between the calibrating basket 7 and the flat laying device 9. The first measuring unit 18 is able to detect the thickness of the foil tube at the respective position. In order to create a profile, the first measuring unit 18 can also be moved around the foil tube, which is indicated by the double arrow 19. In order to be moved, the first measuring unit 18 is arranged to be displaceable on rail 20.

In addition, a control unit 40 is provided which receives the measured values of the first measuring unit 18 via the line 42 and with which the blowing head 8 can be controlled via the line 41 in such a way that a desired thickness profile can be generated. The thickness profile and the control parameters required for this can be generated dynamically for the individual segments in the fluid application device, so that the resulting thickness profile moves in phase with the rotation of the flat laying device.

In addition (or alternatively) the control unit 40 may also evaluate the measured values from a second measuring unit 38 (illustrated in FIG. 2) or from a third measuring unit 45 (illustrated in FIG. 3).

The factors influencing the three measuring units can be considered on a weighted basis when modifying the control commands.

Behind the discharge rollers 10, the double-layer foil web passes through a reversing turret haul-off 15, which has the function of guiding the flattened foil tube from the flat laying device to the stationary roller 16. Arrow 17 indicates that this foil tube is now guided for further processing.

FIG. 2 shows a stretching system 30, which is attached inline to the blown foil system 1 shown in FIG. 1. The foil web 24 first passes through a directing roller 31 and then through several heating rollers 32. The heating rollers 32 have the function of bringing the foil web 24, which has already cooled down completely or partially, back to a temperature which is sufficient for a stretching process.

Once the foil web 24 has been restored to a stretching temperature in the area 28 of the heating rollers 32, it passes the area of the stretch roller 22 and the nip roller 33 and crosses the gap between these two rollers 22, 33. Then the foil web 24 passes through the stretch gap 21 to reach the surface of the stretch roller 23 and leave the stretch gap 21. This stretch roller 23 forms a nip with the nip roller 36. As a result from a lower circumferential speed of the first roller pair 22, 33 as compared to the second roller pair 23, 36, the foil web 24 is elongated, i.e. stretched, in the stretch gap 21. This causes two undesirable effects which make it necessary to cut off longitudinal strips at the sides of the foil webs. The first effect is a reduction in the foil width during stretching (so-called neck-in). The second effect is a thickening of the edges of the foil web. It can be provided that the size of the stretch gap, i.e. the distance between the release edge of the foil web 24 from the roller 22 to the impact edge of the foil web on the roller 23, can be varied. This makes it possible to influence the size of the neck-in and/or the thickening of the foil web at its edges.

After passing through the stretch gap, of which there may also be several in a row, the foil web 24 reaches the area 29, which comprises cooling rollers each referred to by the reference sign 37, in which the foil web 24 is cooled down again. After the foil web 24 leaves this area 29, it has again reached a somewhat lower temperature, so that its surface can survive transport over the directing roller 31 in the transport direction z without additional damage. The foil web 24 is then further moved on in the direction of the arrow 34 and, at the end of optional further processing, is fed to a winding device in which the foil web is wound up as a double-layer foil web or separately into two individual layers. It is not excluded that the foil web or the individual layers of the foil web receive longitudinal cuts and are wound up next to each other in several layers.

Prior to the foil web reaching the stretch unit 30, a cutter or dotting device 35 can be provided with which the double-layer foil web can be cut or dotted, allowing air or any other gas that might still be inside the double-layer foil web to escape. This step results in improved quality of the stretching process and increased accuracy of the thickness profiles of the double-layer foil web to be measured. More particularly, it may be provided that the foil web is longitudinally cut along or near a side edge so that the double-layer foil web is connected by only one side edge. It may also be desirable to cut the double-layer foil web at its two side edges. This is necessary in particular starting at certain thicknesses of the foil web, since the air transport to one side edge of the foil web may not be fast enough.

A second measuring unit 38 is provided downstream of the stretching device 30, by means of which a thickness profile of the double-layer film web can be taken after it has been stretched. It must however be taken into account that without further measures, only the total thickness of the foil web can be measured here, i.e. the sum of the thicknesses of the individual layers. However, it is conceivable, in particular when the double-layer foil web has been given a longitudinal cut, to introduce a contrast medium, such as a metal sheet, between the two layers, so that each layer can be measured separately with respect to its thickness.

The second measuring unit 38 can also be arranged to move along a rail extending at least partially transversely to the transport direction.

FIG. 3 shows a foil cutting device 50, here shown in conjunction with two winding stations, 60, 61, but which can also be provided independently thereof. The foil web 34 may already have been pretreated before entering the foil cutting device. In particular, a first trimming of the edge may already have been carried out so as to already cut off a part of the thickenings at the edge, which leads to an improved quality of an optional pretreatment. Within the foil cutting device, further cutting devices 51, in particular in the form of cutting knives, are provided, each of which carries out the final trimming of the edge of the still double-layer foil web. For this purpose, the double-layer foil web is guided over rollers 52 and 53, which primarily ensure the web tension required for the trimming of the edge. After the trimming of the edge, at the latest, the double-layer foil web is separated into two individual layers which, however, still lie directly on top of each other.

The layers are then actually separated by rollers 54, 55, which form a nip. When it has passed through the nip, the first layer is fed to the first winding station 60, where it passes over various other rollers and is wound onto the winder 62.

Downstream of the separating device, a third measuring unit 45 is provided, the design and operation of which is preferably similar to the second measuring unit 38. The measuring results (in raw form or as an evaluated thickness profile) are fed to the evaluating and/or control device 40 via a data line 44, for example by wire and/or wirelessly.

The second layer can be fed to the winding station 61, the structure and function of which correspond to those of the first winding station. A second thickness measuring instrument may also be provided for measuring the second layer. In this case, reference is made to the description in the preceding paragraph with respect to structure and function.

The thickness measurement profiles taken downstream of the separating device can be continuously added up by the evaluating and/or control device so that a roll sum profile, i.e. the addition of the thickness profiles of the individual layers in a winder, can also be created. In a blown foil system with a reversing device but without a stretch unit, deviations of the foil thicknesses from the average foil thickness, i.e. thickness and/or thinness sections, are spread in the axial direction of the winder so that an overall uniform circumference of the winder is obtained. If a stretch unit is provided, however, this can result in further thick or thin areas that can no longer be corrected by reversing. By creating a roll sum profile as described above, the occurrence of, for example, piston rings (local thickening) on the winder can be detected at an early stage and considered when setting the control parameters for the fluid application device.

FIG. 4 shows a perspective view of the flat laying unit from FIG. 1. Identical parts are referred to with the same reference signs as in FIG. 1, so that in this respect reference is made to the description pursuant to FIG. 1. Directional designations in the following description follow the x, y and z coordinates of the coordinate system 105.

Two opposing heat sources 101 and 103 are located at the lower edge of the two triangular side areas of the flat laying unit 9. The two heat sources 101 and 103 are fixed on the traverses 102 and 104, respectively, and the traverses 102 and 104 move synchronously with the reversing movement of the flat laying unit 9. The synchronous movement ensures that the profiling is placed exactly at the desired place (e.g. in the area of the folded edge of the double-layer foil web formed by the discharge rollers 10). Additionally, the heat sources 101 and 103 are positionally adjustable in the x-direction and y-direction for further increasing the accuracy of the profiling.

The two heat sources 101 and 103 are controlled by a second thinness section control system, which can be connected to the first thinness section control system. The profiling is carried out by heat input from the heat sources 101 and 103, for example by convection or IR radiation. The heat input heats the foil locally to a temperature sufficient to enable plastic deformation by the internal bubble pressure. In the heated and stretched area, a thinness section is thus formed. The extent of the thinness section is measured by subsequent measuring units 38 and/or 45 and controlled by varying the heating power.

During the stretching process, the second thinness section control system is operated combined with the first thinness section control system (which places the thinness sections via segmented control zones in the cooling ring). In the first thinness section control system, the segmented control zones are more frequently at their performance limit, thus limiting the accuracy and speed of the control process. The profiling can consequently operate at a higher overall control speed as well as a larger control stroke compared to what would be possible with regulation using only the first thinner section control system. Furthermore, this ensures that the thinness sections are placed accurately in the area of the fold edge. By using the second thinness section control system, the heating cartridges in the cooling ring can operate at lower power and thus have more control stroke to regulate the foil profile. The profile quality and the control speed can thus be increased.

| Reference sign list | |
|---|---|
| 1 | Blown foil line |
| 2 | Extruder |
| 3 | Line |
| 4 | Blowing head |
| 5 | Circular gap |
| 6 | Foil tube |
| 7 | Calibrating basket |
| 8 | Cooling ring |
| 9 | Flat laying unit |
| 10 | Discharge roller |
| 11 | Tube axis |
| 12 | Arrow indicating the rotatability of the flat laying device |
| 13 | Thinness section |
| 14 | Arrow indicating the movement of the thinness sections |
| 15 | Turret haul-off |
| 16 | Stationary roller |
| 17 | Arrow indicating the foil tube for further processing |
| 18 | Measuring unit |
| 19 | Double arrow indicating the movement of the measuring unit 18 |
| 20 | Rail |
| 21 | Stretch gap |
| 22 | First roller pair |
| 23 | Stretch roller |
| 24 | Foil web |
| 25 | |
| 26 | |
| 27 | |
| 28 | |
| 29 | Area comprising cooling rollers 37 |
| 30 | Stretch unit |
| 31 | Directing roller |
| 32 | |
| 33 | Nip roller |
| 34 | Foil web |
| 35 | Dotting device |
| 36 | Second roller pair |
| 37 | |
| 38 | Second measuring unit |
| 39 | |
| 40 | Evaluating and/or control device |

| Reference sign list | |
|---|---|
| 41 | |
| 42 | |
| 43 | |
| 44 | Data line |
| 45 | Third measuring unit |
| 50 | Foil cutting device |
| 51 | Cutting devices |
| 52 | Roller |
| 53 | Roller |
| 54 | Roller |
| 55 | Roller |
| 60 | First winding station |
| 61 | Winding station |
| 62 | Winder |
| 100 | |
| 101 | Heat Source |
| 102 | Traverse |
| 103 | Heat Source |
| 104 | Traverse |
| 105 | Coordinate system |

The invention claimed is:

1. An apparatus for the production of an inline stretched tubular-foil by a blowing process,
the apparatus having a blown foil system comprising an extruder, a blowing head, a cooling ring, a calibrating basket, a flat laying unit and a reversing turret haul-off,
wherein plastics in granulated form are plasticized in the extruder to form a viscous mass, wherein the mass is formed in a ring shape in the blowing head and discharged through an annular nozzle of the blowing head, wherein the mass forms a circular foil tube,
wherein the circular foil tube is led into the calibrating basket, wherein the circular foil tube is led after the calibrating basket to the flat laying unit, in which the circular foil tube forms an elliptical cross section with an increasing eccentricity, which is formed by two discharge rollers into a double-layer foil web, to form a flattened foil,
wherein the reversing turret haul-off guides without stretching the flattened foil from the flat laying device to a stationary roller,
a stretching system inline to the stationary roller, wherein the stretching system monoaxially stretches the flattened foil in a machine direction, the stretching system comprising: one or more directing rollers that direct the flattened foil to a heating roller that heats the flattened foil to a temperature sufficient for a stretching process, a stretch roller, and a nip roller, wherein the stretch roller has a lower circumferential speed compared to the nip roller thereby elongating the flattened foil,
with a first thinness section control system which operates segmented control zones in the cooling ring to form thinness sections in such a way that, during stretching, a foil is produced with a thickness profile with the smallest possible deviations from a medium foil thickness over the complete foil width,
with a second thinness section control system,
wherein the second thinness section control system operates two opposing heat sources between the calibrating basket and the flat laying unit, with the calibrating basket and the flat laying unit acting on the film tube in a region in which the film tube has not yet been laid flat,
wherein the second thinness section control system creates thinning zones in the film profile,
and wherein the second thinness section control system is connected to the first thinness section control system.

2. The apparatus according to claim 1, wherein the second thinness section control system is activated when the segmented control zones of the first thinness section control system are at power limit.

3. The apparatus according to claim 2, wherein the second thinness control system is switched on to control the thinness sections exactly in two folded edges of the flat laying unit.

4. The apparatus according to claim 2, wherein a measuring unit for detecting the thickness profile of the foil produced is provided downstream of the stretching unit, viewed in the transport direction.

5. The apparatus according to claim 1, wherein the second thinness control system is switched on to control the thinness sections exactly in two folded edges of the flat laying unit.

6. The apparatus according to claim 5, wherein a measuring unit for detecting the thickness profile of the foil produced is provided downstream of the stretching unit, viewed in the transport direction.

7. The apparatus according to claim 1, wherein a measuring unit for detecting the thickness profile of the foil produced is provided downstream of the stretching unit, viewed in the transport direction.

8. The apparatus of claim 1, wherein the flat laying unit comprises two triangular side areas and the two opposing heat sources are located at the lower edge of the two triangular side areas of the flat laying unit.

9. The apparatus of claim 1, wherein the two opposing heat sources are fixed on traverses, and the traverses move synchronously with a reversing movement of the flat laying unit.

10. The apparatus of claim 9, wherein the two opposing heat sources are adjusted along and transversely to the traverses.

11. The apparatus of claim 1, wherein the second thinness section control system produces thinness sections in the area of the fold edge.

12. The apparatus of claim 1, wherein the two opposing heat sources of the second thinness control system rotate with the reversing turret haul-off.

* * * * *